US009635310B2

(12) United States Patent
Chang et al.

(10) Patent No.: US 9,635,310 B2
(45) Date of Patent: Apr. 25, 2017

(54) BAND TRANSLATION WITH PROTECTION OF IN-HOME NETWORKS (71) Applicant: MaxLinear, Inc., Carlsbad, CA (US)

(72) Inventors: Glenn Chang, Carlsbad, CA (US); Raja Pullela, Irvine, CA (US); Sridhar Ramesh, San Diego, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 65 days.

(21) Appl. No.: 14/270,037

(22) Filed: May 5, 2014

(65) Prior Publication Data

US 2014/0329481 A1  Nov. 6, 2014

Related U.S. Application Data (60) Provisional application No. 61/819,610, filed on May 5, 2013.

(51) Int. Cl.
H04B 7/08 (2006.01)
H04N 7/10 (2006.01)
H04N 7/20 (2006.01)
H04N 21/436 (2011.01)
H04H 40/18 (2008.01)
H04B 1/00 (2006.01)
H04B 1/10 (2006.01)

(52) U.S. Cl.
CPC ............. *H04N 7/106* (2013.01); *H04N 7/20* (2013.01); *H04B 1/0075* (2013.01); *H04B 1/1036* (2013.01); *H04H 40/18* (2013.01); *H04N 21/436* (2013.01)

(58) Field of Classification Search
CPC .... H04B 1/005; H04B 1/0075; H04B 1/1036; H04B 1/16; H04H 40/00; H04H 40/18; H04N 21/43; H04N 21/436
USPC ......... 455/132, 137, 139, 230, 552.1, 553.1, 455/500, 63.1, 63.3
See application file for complete search history.

(56) References Cited

U.S. PATENT DOCUMENTS

| 6,973,328 | B1 * | 12/2005 | Suematsu | 455/552.1 |
| 2005/0190777 | A1 * | 9/2005 | Hess et al. | 370/401 |
| 2010/0210272 | A1 * | 8/2010 | Sundstrom et al. | 455/450 |
| 2010/0261500 | A1 * | 10/2010 | Karaoguz et al. | 455/552.1 |
| 2011/0136455 | A1 * | 6/2011 | Sundstrom et al. | 455/196.1 |

(Continued)

*Primary Examiner* — Duc M Nguyen
(74) *Attorney, Agent, or Firm* — McAndrews, Held & Malloy, Ltd.

(57) ABSTRACT

Methods and systems are provided for band translation with protection. A signal processing circuitry (chip) may be configured to handle a plurality of signals, comprising at least a first signal corresponding to internal communication within an in-premises network and at least a second signal originating from a source external to the in-premises network; and to process on-chip the plurality of input signals, to generate one or more output signals. In this regard, at least one output signal may comprise components corresponding to the first signal and the second signal; and the processing may be configured to mitigate on-chip, during generating of the one or more outputs, at least one effect of including in the at least one output signal a first component corresponding to one of the first signal and the second signal on a second component corresponding to the other one of the first signal and the second signal.

17 Claims, 5 Drawing Sheets (56) References Cited

U.S. PATENT DOCUMENTS

| | | | |
|---|---|---|---|
| 2011/0281543 A1* | 11/2011 | White et al. | 455/337 |
| 2012/0178398 A1* | 7/2012 | Sorrells | H03D 7/00 |
| | | | 455/323 |
| 2012/0214543 A1* | 8/2012 | Behzad et al. | 455/552.1 |
| 2013/0028352 A1* | 1/2013 | Leenaerts et al. | 375/316 |
| 2013/0045704 A1* | 2/2013 | Kaukovuori et al. | 455/255 |
| 2013/0222700 A1* | 8/2013 | Lee | 348/731 |
| 2013/0230078 A1* | 9/2013 | Chang et al. | 375/147 |
| 2013/0337740 A1* | 12/2013 | Pullela et al. | 455/12.1 |

\* cited by examiner

BAND TRANSLATION WITH PROTECTION OF IN-HOME NETWORKS

CLAIM OF PRIORITY

This patent application makes reference to, claims priority to and claims benefit from the U.S. Provisional Patent Application No. 61/819,610, filed on May 5, 2013, which is hereby incorporated herein by reference in its entirety.

TECHNICAL FIELD

Aspects of the present disclosure relate to communications. More specifically, certain implementations of the present disclosure relate to methods and systems for band translation with protection of in-home networks.

BACKGROUND

Existing methods and systems for handling communication in local networks (e.g., in-home or in-premises networks), particularly band translations, may be inefficient. In this regard, band translation may cause signals of one communication standard to interfere with signals of another communication standard. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for band translation with protection of in-home networks, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

Certain example implementations may be found in method and system for non-intrusive noise cancellation in electronic devices, particularly in user-supported devices. As utilized herein the terms "circuits" and "circuitry" refer to physical electronic components ("hardware") and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
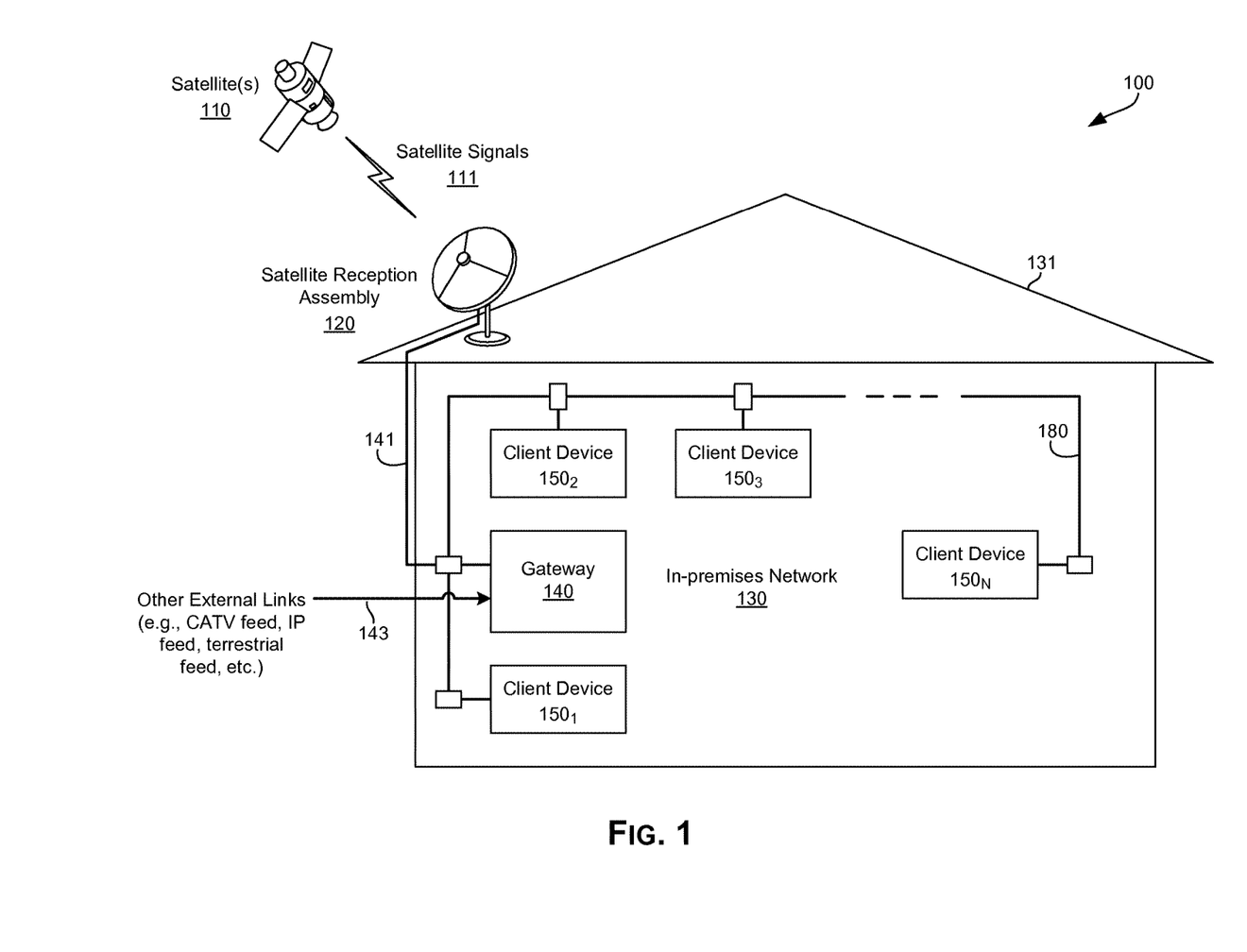
FIG. 1 illustrates an example distribution system, for providing content to an in-home network.

FIG. 1 illustrates an example distribution system, for providing content to an in-home network. Referring to FIG. 1, there is shown a communication system 100 comprising one or more satellites 110, a satellite reception assembly 120, and an in-premises network 130.

The communication system 100 may comprise a plurality of devices (e.g., the satellite 110, the satellite reception assembly 120, and one or more devices in the in-premises network 130), and communication resources (e.g., storage, processing, and/or routing resources in distribution networks) to facilitate and/or support communications among the plurality of devices. The communication system 100 may be configured for use in distributing content and other data. For example, the communication system 100 may correspond to broadband, cable and/or satellite distribution topology.

The satellite 110 may be utilized to communicate satellite signals 111, which may typically only comprise downlink communication signals; however, the disclosure is not so limited, and in some instances the satellite signals 111 may also comprise uplink signaling. The satellite signals 111 may be utilized, for example, to broadcast satellite television content. In this regard, the satellite signals 111 may comprise Direct Broadcast Satellite (DBS) signals, in K, Ka, and/or Ku bands. The disclosure, however, is not limited to any particular type of satellite signal. While only satellite(s) 110 are shown in FIG. 1, the system 100 may comprise other types of "headends," each comprising suitable circuitry for performing headend related functions, such as within a particular distribution topology—e.g., for a particular type of communication setup, using one or more particular protocol(s), and/or via particular type(s) of connections. For example, other headends may be used in conjunction with cable, terrestrial, and/or broadband distribution topologies.

The satellite reception assembly 120 may be configured for satellite based communications (e.g., being installed on the roof of the premises 131, so as to allow reception of satellite based broadcasts, and, in some instances, transmission—i.e. uplink, of satellite communications). For example, the satellite reception assembly 120 may be a satellite "dish". In this regard, the satellite reception assembly 120 may comprise, for example, a signal reflector (e.g., a parabolic reflector) which may be used for capturing satellite signals (e.g., the satellite signals 111), such as by reflecting them into a particular point (e.g., focal point of the parabolic reflector). The satellite reception assembly 120 may also comprise circuitry operable to receive and/or process the satellite signals.

For example, the circuitry may be incorporated into a housing, which may be mounted on a boom at or near the focal point of the parabolic reflector. The circuitry may be configured to, e.g., process captured satellite signals so as to recover data carried therein (e.g., television channels, media content, etc.), and to generate a suitable output, corresponding to the recovered data, for transmission to other devices that may handle use and/or distribution of the data (e.g., gateway 140, accessed via a link 141). For example, the circuitry may provide low-noise block down-converter (LNB) functionality, and/or additional functions (generating an output for communication on the link 141). The LNB functionality may comprise performing operations such as, for example, low-noise amplification, filtering, and/or down-converting, to enable generating corresponding IF signals. For example, the IF signals may be in the L-band, half-L-band (950-1450 MHz), extended-L-band (or 'Ext-L-band', 250-2150 MHz, 300-2350 MHz), or the like. Of course, a direct conversion architecture (i.e., zero IF) may also be used, for direct conversion to baseband or DC without the use of IF signals.

The link 141 may comprise one or more wired, wireless, and/or optical links. The link 141 may comprise, for example, a wired (e.g., coaxial and/or twisted-pair) and/or wireless communication medium which carries physical layer symbols in accordance with, for example, DBS standards, but may also comprise other protocols, such as Ethernet or Multimedia over Coax Alliance (MoCA).

The in-premises network 130 may comprise a local network setup and/or be configured within a particular premises 131 (e.g., residential, industrial, commercial, educational, medical, etc.), to enable providing services within the premises 131. The services may comprise online (e.g., Internet) access/interactivity, access to television (or other similar multimedia or content distribution) broadcasts, and the like. Each in-premises network 130 may comprise a plurality of devices that may be used in conjunction with services and/or functions available in the network. For example, the in-premises network 130 may comprise at least one gateway 140 and one or more client devices 150.

The gateway 140 may comprise suitable circuitry for providing and/or supporting various services or functions in a particular location (e.g., the in-premises network 130), such as to support a plurality of client devices (e.g., the client devices 150) present in that location. The gateway 140 may communicate with the client devices 150 over point-to-point or indirect links 180. The services or functions that may be provided and/or supported by the gateway 140 may pertain to, for example, broadband access, broadcast/television access, content distribution, and the like. In this regard, the gateway 140 may be configured to support reception of signals communicated from external entities (e.g., cable, terrestrial, satellite, and/or IP head-ends), and process the signals as necessary for obtaining data (e.g., content) carried thereby, and outputting the data via corresponding signals over the internal links 180 to the client devices 150.

Similarly, the gateway 140 may be operable to receive signals communicated from the client devices 150, over the internal links 180, and process the signals as necessary for obtaining data and outputting the data via corresponding signals to the external entities. Accordingly, the term "gateway" in this disclosure refers to devices that may perform set-top box (STB) and/or receiver functions (e.g., for satellite, cable, terrestrial television, or the like), over-the-air reception (e.g., a DBS satellite dish assembly), WAN/LAN modem functions, and the like. In this regard, "set-top box" or "receiver" functions may comprise functions utilized in receiving and/or processing signals (carrying data) from head-ends (e.g., cable, satellites, and/or broadband head-ends), web servers, and the like to devices within the premises.

In some instances, at least some of the data utilized in the in-premises network 130 may be received from external sources, such as from broadband or broadcast sources (e.g., satellites, the terrestrial TV head-ends, and/or the cable head-ends). In this regard, the gateway 140 may be utilized to service the in-premises network 130, such as, for example, by providing to the client devices 150 access to external networks/connections. In such instances, the gateway 140 may facilitate communication of signals between the client devices 150 and the external sources. For example, the gateway 140 may be utilized to route communications between cable head-ends 120 and one or more of client devices 150. In this regard, a client device 150 may receive from the cable head-end 120 streams containing, e.g., multimedia content. In some instances, the interactions with the cable head-end may be bi-directional. For example, client device 150 may transmit to the cable head-end 120 signals or streams, such as those containing user commands or requests (e.g., for particular content) or the like. Communications between client devices and head-ends may be configured in accordance with one or more particular protocol(s). For example, cable communications may be configured in accordance with DOCSIS protocol(s), satellite communications may be configured in accordance with DBS protocol(s), etc.

The client devices 150 may comprise devices which may be operable to utilize services or functions available in a particular location—e.g., those provided by the gateway 140. In this regard, the client devices 150 may be operable to communicate with the gateway 140, such as, for example, via one or more point-to-point links 180. For example, in instances where the gateway 140 is utilized to support broadband/television access and/or content distribution, the client devices 150 may comprise televisions and similar devices that may be used in consuming (e.g., displaying or playing) content that may be broadcasted (e.g., via terrestrial signals, satellite signals, cable signals, and/or over the Internet) and received via the gateway 140. The disclosure is not limited, however, to any particular type of client device. The links 180 between the gateway 140 and the client devices 150 may comprise, for example, wired, wireless, and/or optical links that may be suited for use in an environment such as the in-home network. For example, the links 180 may comprise wired connections (e.g., HDMI connections, Display Port links, Multimedia over Coax Alliance (MoCA) links, Ethernet connections, or the like), and/or wireless connections (e.g., WiFi, ZigBee, wireless USB, or the like).

In operation, the communication system 100 may be used as a distribution system, for enabling distribution of data (e.g., multimedia or other content) to a plurality of end-users (e.g., client devices 150 in in-premises network 130). In this regard, the headends, such as the satellite 110, may be used to broadcast signals carrying particular data (e.g., content, such as TV channels or other multimedia) with communication system 100. The data may be generated or obtained (e.g., from dedicated content sources) data, and may be processed for distribution with the communication system 100. In this regard, the processing may comprise generating the satellite signals 111, which may be broadcast to a plurality of recipients (e.g., including the in-premises network 130). In some instances, the communication system 100 may be configured to support upstream communications. In this regard, the in-premises network 130 may be operable to generate (and headends, such as the satellite 110, may be operable to receive and handle) upstream signals (e.g., the satellite signal 111, or similar signals). The upstream signals may be used, for example, to convey data (e.g., user generated content), user inputs/commands (e.g., requests for particular content), control data (e.g., status, errors, etc.), and the like.

Within the in-premises network 130, the gateway 140 and the client devices 150 may communicate with one another via the internal links 180 (e.g., HDMI connections, MoCA, WiFi, etc.). For example, the gateway 140 may receive signals originating from sources external to the in-premises network 130 (e.g., downlink broadcast signals, comprising, for example, signals received over link 141, corresponding to satellite signals 111 captured by satellite reception assembly 120, and/or signals received from other external link(s) 143, which may corresponding to other feeds, such as cable television, IP, and/or terrestrial feeds) and may extract data carried therein (e.g., television or other multimedia content), and may then distribute that data within the premise network 130 using signals communicated over the internal links 180. In uplink communications, the gateway 140 may receive (e.g., from the client devices 150) signals communicated within the in-premises network 130, may process these signals (such as to extract data carried therein), and may generate and transmit corresponding upstream signals, to the headends (e.g., the satellite 110) or other external entities, accessible via external networks (e.g., cable distribution network). Further, in some instances, the gateway 140 may receive signals originating within the in-premises network 130 (e.g., signals received over links 180 from particular client device(s) 150) and may then transmit corresponding signals within the in-premises network 130 (e.g., using signals communicated over internal links 180, which may targeted for other client devices 150).

In some instances, internal and external communications associated with local (e.g., home) networks may be combined into the same signals. For example, in instances where certain devices and/or physical mediums may be shared for internal and external communications, content corresponding to both external communication (e.g., satellite signals) and internal communication (e.g., peer-to-peer communication within the in-premises network 130) may be combined. This may occur, for example, at the gateway 140. In this regard, the gateway 140 may concurrently receive satellite signals received via the satellite reception assembly 120 (being intended for distribution to one or more of the client devices 150$_i$) as well as receiving local communication (e.g., communication from one of the client device 150, and intended for forwarding, via the gateway 140, to one or more other ones of the client devices 150$_j$). Thus, where the same client device 150, is intended to receive a satellite signal and a local signal, the output signal from the gateway 140 to that client device may comprise components corresponding to both signals. While combining components from signals having such different types (e.g., external communication vs. local communication) may usually not cause any issues since these communications would typically occupy spectral bands that are sufficient far apart, in some instances the processing performed on one or both of these signals may cause issues. For example, the down-conversion performed on certain satellite signals, having particular bands, may result in corresponding output components occupying bands that are typically used (or are near bands typically used) by certain types of internal signals. For example, processing satellite signals corresponding to certain bands (e.g., FSS signals in the Ku band) may result in output components occupying bands that are typically used for MoCA communication, and as such attempting to include components of both of these satellite signals and internal (e.g. MoCA) signals into the same output signal(s) may result in substantial cross interference so as to render components corresponding to one or both unusable at the receive-side. Accordingly, in various implementations of the present disclosure, signal processing performed by various signal reception components in local (e.g., home) networks may be adaptively setup and/or configured to detect and/or mitigate such issues. Example implementations are described with respect to the following figures.

Figure 2:
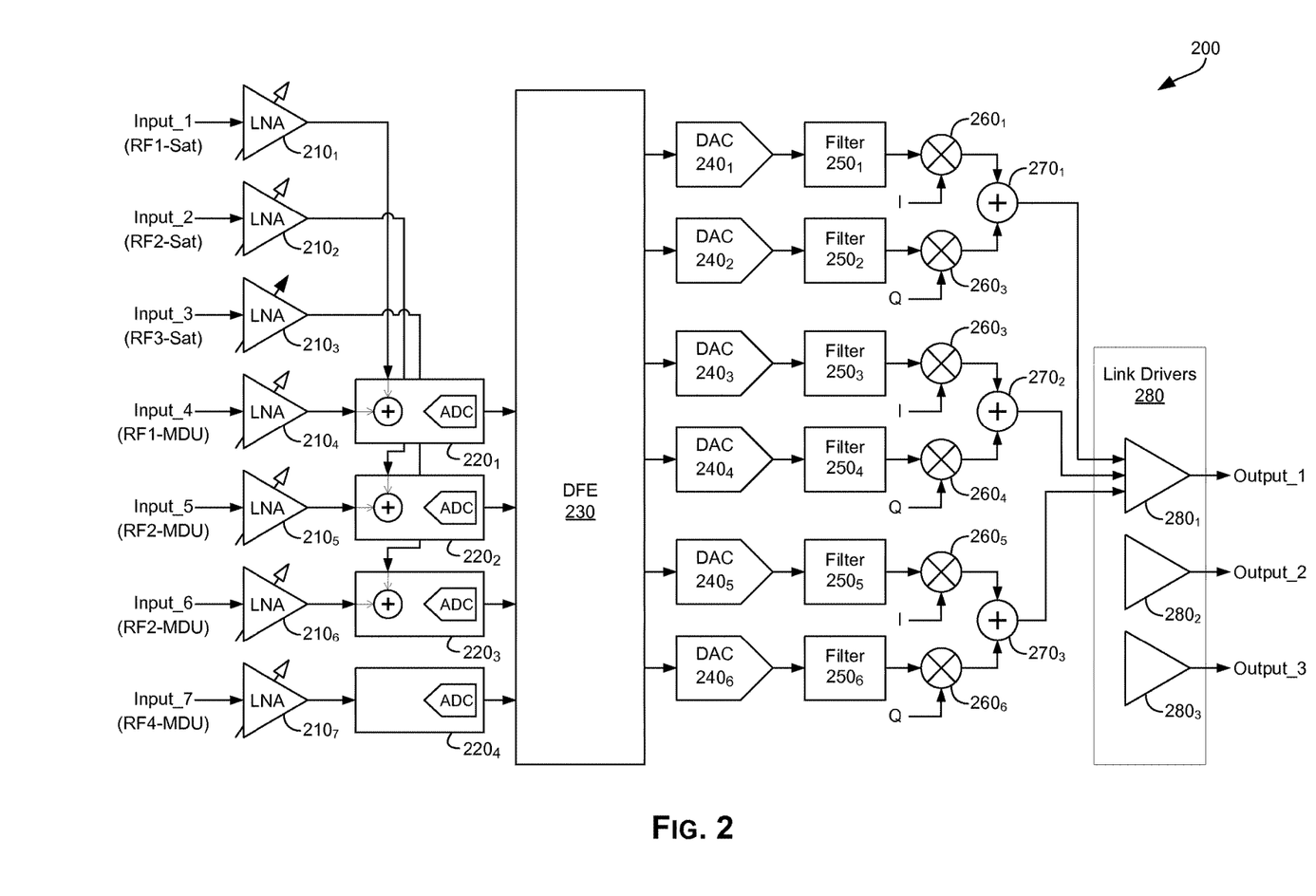
FIG. 2 illustrates an example electronic system that may be configured to provide band translation with protection of in-home networks.

FIG. 2 illustrates an example electronic system that may be configured to provide band translation with protection of in-home networks. Referring to FIG. 2, there is shown a system 200, which may correspond to a signal reception and processing circuitry architecture that may support band translation with protection of in-home networks.

The system 200 may comprise suitable circuitry for receiving and processing a plurality of input signals, to generate a corresponding plurality of output signals (e.g., intermediate frequency (IF) signals) which may be configured for communication to one or more particular devices, over one or more particular links. The plurality of input signals may comprise, for example, radio frequency (RF) signals. In some instances, the plurality of input signals may comprise signals corresponding to different categories of communications (and, further, to different types within the same category)—e.g., "internal" signals, comprising signals intended for local communications (e.g., within an in-home network), and "external" signals, comprising signals communicated externally to the in-home network (e.g., satellite signals, received from and/or transmitted to satellites). Further, the plurality of input signals may differ from one another in other ways—e.g., corresponding to different sources even when the signals belong to the same category/type (e.g., external/satellite signals originating from different satellites); differing with respect to certain characteristics (e.g., having different polarizations); and/or by corresponding to different spectrum bands (e.g., corresponding to direct broadcast satellite (DBS) and/or fixed service satellite (FSS) bands, when they are satellite signals).

In some instances, the system 200 may be implemented via one or more devices—e.g., the one or more devices may be configured to provide, collectively, the signal reception and/or processing functions performed by the system 200. For example, with reference to the example setup shown in FIG. 1, the system 200 may be integrated into and/or may correspond to the satellite reception assembly 120 (or more particularly the processing circuitry thereof) and/or the gateway 140.

In some instances, the system 200 may be operable to perform and/or support combining content from more one or more input signals, into one or more output signals. For example, the system 200 may be configured to apply channel and/or band stacking during reception and/or processing of the plurality of input signals.

In the example implementation shown in FIG. 2, the system 200 may be configured to support reception of 7 different RF signals: Input_1 through Input_7. In this regard, the input signals Input_1 through Input_7 may comprise a combination of internal and external signals. As shown in FIG. 2, the first three input signals Input_1 to Input_3 may correspond to satellite input feeds signals, while the remaining four input signals Input_4 to Input_7 may correspond to internal (in-premises) communications (e.g., multi-dwelling unit (MDU) signals). Further, each of the input signals Input_1 to Input_3 may comprise a satellite signal, comprising direct broadcast satellite (DBS) and/or fixed service satellite (FSS) components.

The system 200 may comprise, for example, a plurality (e.g., seven) of low-noise amplifiers (LNAs) $210_1$-$210_7$, a plurality (e.g., four) of input front-end blocks $220_1$-$220_4$, a digital front end (DFE) 230, a plurality (e.g., six) of digital-to-analog convertors (DACs) $240_1$-$240_6$, a plurality (e.g., six) of output filters $250_1$-$250_6$, a plurality (e.g., six) of output mixers $260_1$-$260_6$, a plurality (e.g., three) of adders $270_1$-$270_3$, and a link driver 280, which may comprise a plurality (e.g., three) of drivers $280_1$-$280_3$ (which may comprise, for example, power amplifiers). In this regard, it should be understood that implementation described in FIG. 2 is only an example implementation, and as such the disclosure is not limited to any particular number of elements within each type of component described herein.

Each LNA $210_i$ may be operable to amplify signals, which may be, as received, too 'weak' for processing within the system 200. The amplification performed by each LNA $210_i$ may be adaptively configured, such as based on the category/type of communication associated with corresponding input signals. Thus, LNAs $210_1$-$210_3$ may be particularly configured to amplify satellite signals, whereas LNAs $210_4$-$210_7$ may be particularly configured to amplify internal signals (e.g. MDU signals).

Each input front-end block $220_i$ may comprise circuitry from processing an input signal (e.g., after amplification via a corresponding LNA $210_i$), to make the inputs suitable from further processing (e.g., via the DFE 230). In this regard, each input front-end block $220_i$ may be operable to perform at least analog-to-digital (ADC) conversions, and may also be operable to perform such other functions as mixing (e.g., applying in-phase and quadrature signals, such as to allow IQ calibration), and/or filtering (e.g., applying low-pass filtering). In some instances, the input front-end blocks $220_i$ may be configured to combine multiple signals, including signals corresponding to a different category/type of communication. For example, as shown in FIG. 2, each of the input front-end blocks $220_1$-$220_3$ may comprise an adder circuit, which may be used in combining (e.g., adding) a plurality of input signals. Hence, in an example use scenario, each of the input front-end blocks $220_1$-$220_3$ may be operable to combine pairs from each of input signals Input_1 to Input_3 and input signals Input_4 to Input_6. Such combining may be done particularly where the input signals to be combined would occupy different spectral bands (e.g., due to being in different categories/types of communications).

The DFE 230 may comprise circuitry for performing various signal processing functions that may be used when generating one or more output signals based on one or more input signals. The DFE 230 may be operable to perform such functions as I/Q calibration, equalization, channelization, or the like. In an example implementation, the DFE 230 may be configured to provide crossbar (Xbar) switching function, whereby one or more inputs of the DFE 230 may be mapped onto one or more outputs of the DFE 230. The mapping may comprise channel and/or band based stacking.

Each of the DACs $240_1$-$240_6$ may comprise circuitry for applying digital-to-analog conversions (e.g., on corresponding plurality of outputs of the DFE 230). Each of the output filters $250_1$-$250_6$ may comprise circuitry for filtering signals (e.g., outputs of the DACs $240_1$-$240_6$), based on one or more criteria. For example, the output filters $250_1$-$250_6$ may be configured as low-pass filters (LPFs)—that is being configured to pass low-frequency signals (below a particular threshold, or a "cutoff frequency") and to attenuate signals with frequencies higher than the cutoff frequency.

Each of the output mixers $260_1$-$260_6$ may comprise circuitry mixing (e.g., by multiplying) a plurality of signals. In this regard, the output mixers $260_1$-$260_6$ may be used to apply in-phase and quadrature signals to the outputs of the DFE 230, to generate in-phase and quadrature components of the outputs of the DFE 230. Each adder $270_i$ may be operable to combine (e.g., by adding or subtracting) a plurality of signals. For example, each of the adders $270_1$-$270_3$ may be used to combine the in-phase and quadrature components corresponding to an output of the DFE 230.

In operation, the system 200 may be utilized to receive and handle a plurality of input signals (Input_1 to Input_7). In this regard, the system 200 may be incorporated into and/or may correspond to one or more devices used within an in-premises network (e.g., the satellite reception assembly 120 and/or the gateway 140 of the in-premises network 130) to receive signals communicated within and/or externally to/from the in-home network. Accordingly, the signals handled by the system 200 may comprise both signal(s) corresponding to external communications (e.g., satellite broadcasts) as well as signals corresponding to internal communications (within in-premises networks).

The system 200 may generate one or more outputs, which may, sometimes, comprise content from more than one input. For example, the system 200 may be configured to combine content from multiple inputs, such as by combining the input signals or component(s) thereof—e.g., during initial processing, via the input front-end blocks $220_1$-$220_4$; by use of integrated stacking, which may be performed by the DFE 230 as part of the crossbar (Xbar) switching function; and/or when generating the output (e.g., IF) signals in the link driver(s) 280. In this regard, the DFE 230 may be operable to perform digital band stacking, which may be implemented with or without full-band capture. For example, the DFE 230 may be used to provide crossbar (Xbar) switching, between X (an integer number) inputs and Y (an integer number) outputs, and may provide channel and/or band stacking by combining one or more inputs, which may have been processed to comprise particular channels or bands, into one or more outputs. The DFE 230 may also apply additional signal processing functions (e.g., I/Q calibration, equalization, channelization, etc.).

These functions, along with the additional adjustments or signal processing functions (e.g., analog-to-digital conversions, digital-to-analog conversions, filtering, amplifications, down-conversions, up-conversions, etc.), which may be applied to the inputs and/or outputs of the DFE 230, may be configured in an adaptive manner. In this regard, the components and/or functions of the DFE 230 (and/or components used in the overall path that includes the DFE 230) may be configured to provide the desired channel and/or band stacking, and/or to generate outputs at different frequencies such that they can be combined onto one or more physical channels (e.g., a coaxial cable), corresponding to the plurality of link drivers $280_1$-$280_3$ for example, to enable conveyance to client devices.

In some implementations, the processing done in the system 200 may comprise performing band translation. For example, the received signals may be down-converted, such as to lower frequency bands, during processing in the system 200 and/or when generating output signals. The received satellite signals (e.g., Input_1-Input_3) may comprise, for example, direct broadcast satellite (DBS) and/or fixed satellite service components in the K, Ka, and/or Ku frequency bands. Such signals may be down-converted, for example, from the 11.7-12.7 GHz range to the 450-1450 MHz. Applying such band translation may cause issues, however, as new bands may overlap, and as such may interfere with (cause interference to and/or be subjected to interference by) other types of signals handled in the system 200 that may have similar ranges—e.g., MoCA signals, which may be present, for example, at the output stage of the system 200 (e.g., being included in the IF outputs of the link driver 280). Accordingly, in various implementations, the system 200 may be configured to detect and/or address issues that may arise with band translation. An example of handling of such scenario is explained in more details with respect to FIGS. 3A and 3B.

Figure 3A:
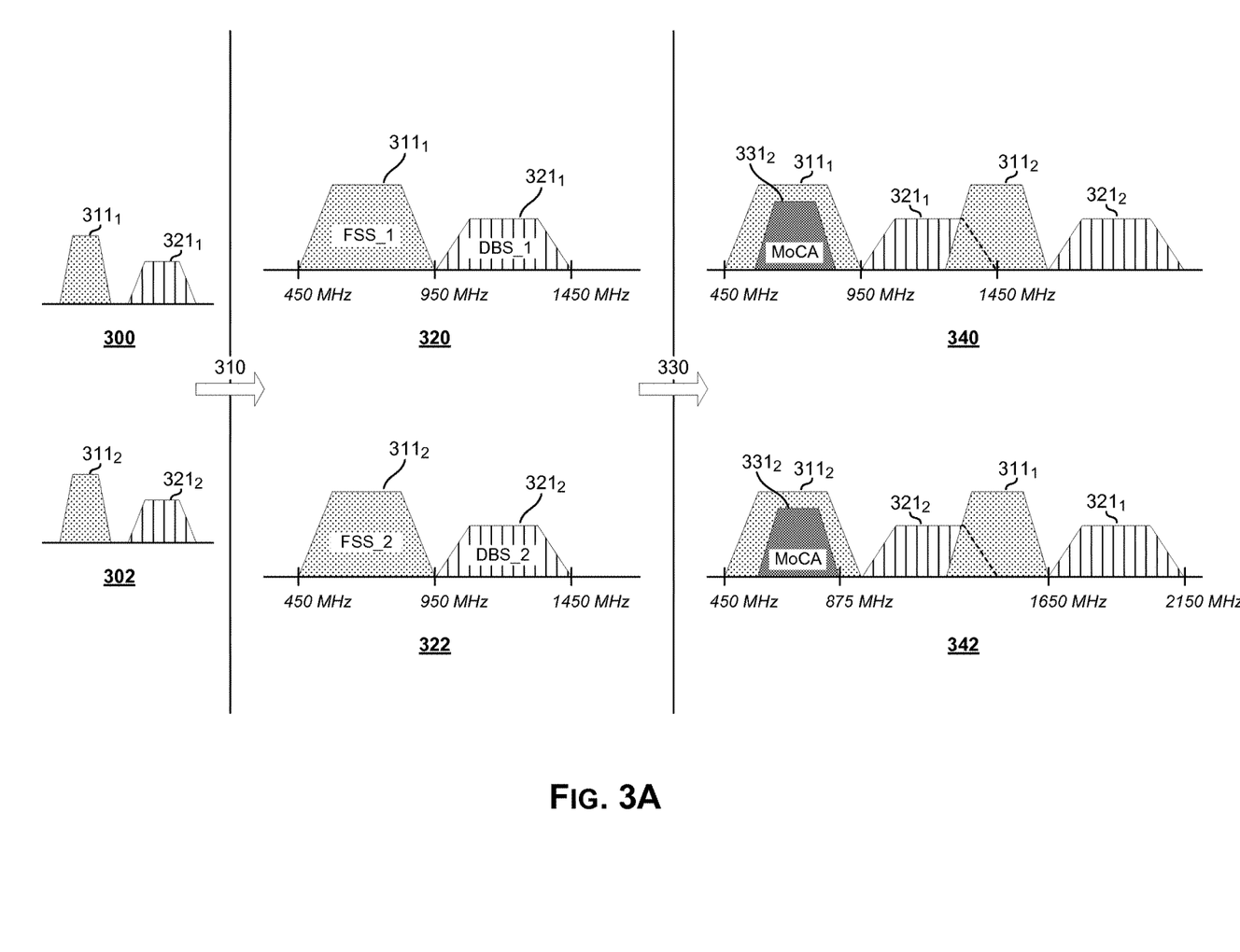
FIG. 3A illustrates example band translation in a system handling received signals corresponding to a plurality of standards or bands, without protection of signals of an in-home network.

FIG. 3A illustrates example band translation in a system handling received signals corresponding to a plurality of standards or bands, without protection of signals of an in-home network.

Shown in FIG. 3A is an example band translation in accordance with a legacy scheme, such as in a system (e.g., system 200, when configured in accordance with legacy operations) handling a plurality of satellite signals (e.g., from multiple satellites on multiple inputs) as well as internal signals (e.g., communications for in-premises networks). In the example scenario depicted in FIG. 3A, band translation may be applied during processing of two input satellite signals 300 and 302. In this regard, as shown in FIG. 3A, each of the input satellite signals 300 and 302 may comprise, for example, a FSS signal band and DBS signal band (e.g., FSS_1 $311_1$ and DBS_1 $321_1$ for input signal 300; FSS_2 $311_2$ and DBS_2 $321_2$ for input signal 302). For example, as received, the DBS signals may be in the range of 12.2 GHz to 12.7 GHz at the Ku band, while FSS signals may be in the range of 11.7 GHz to 12.2 GHz at the Ku band.

During processing, the input satellite signals 300 and 302 first may be down-converted 310 (e.g., via one or more low-noise down-converters), such as from Ku (or Ka) band to L-band, to corresponding down-converted signals 320 and 322, respectively, in a frequency from 950 to 1450 MHz before being presented as inputs of band translation. After band translation 330, the resultant bands may be presented in output signals 340 and 342 (e.g., at one of three outputs of the system 200), either in the same frequency range (950 to 1450 MHz), or in other frequency ranges (e.g., the frequency range 1650 to 2150 or the frequency range 2500 to 3000 MHz).

In some instances, however, the same output being used to carry a down-converted satellite input may carry signals from other inputs in different frequency bands. In this regard, there may be two or three output bands on each output of the system. Due to the presence of other signals in the Ku band, the received signal may contain significant energy outside the frequency range of 950 to 1450 MHz. For example, as shown in FIG. 3A, the DBS signals, received at Ku Band (e.g., 12.2 to 12.7 GHz), may be converted down to 950 to 1450 MHz in the L-Band, whereas the FSS signals, received at Ku Band (e.g., 12.2 to 12.7 GHz), may be present after down-conversion in the frequency range of 450 MHz to 950 MHz. This creates a residual signal at the output of the band translation system. In instances where output may be received within an in-premises network, such residual signal may cause interference to internal signals (e.g., internal signals falling in bands overlapping with bands now occupied by the satellite signals or their residual signals). For example, in instances where home clients are communicating using MoCA signals (e.g., MoCA signals $331_1$ and $331_2$) in the frequency range of 650 to 875 MHz, these signals would overlap with the (down-converted) FSS signals (FSS_1 $311_1$ and FSS_2 $311_2$).

These issues (interference caused to the internal signals—e.g., the MoCA signals $331_1$ and $331_2$) may be mitigated, such as by using an external filter that applies very sharp filtering (e.g., in the frequency range of 450 to 875 MHz) on the systems outputs. Such approach, however, may not be very desirable as it would require adding hardware (e.g., dedicated filtering circuitry), and/or may add complexity (e.g., requiring control and/or configuration of the added filtering resources).

Figure 3B:
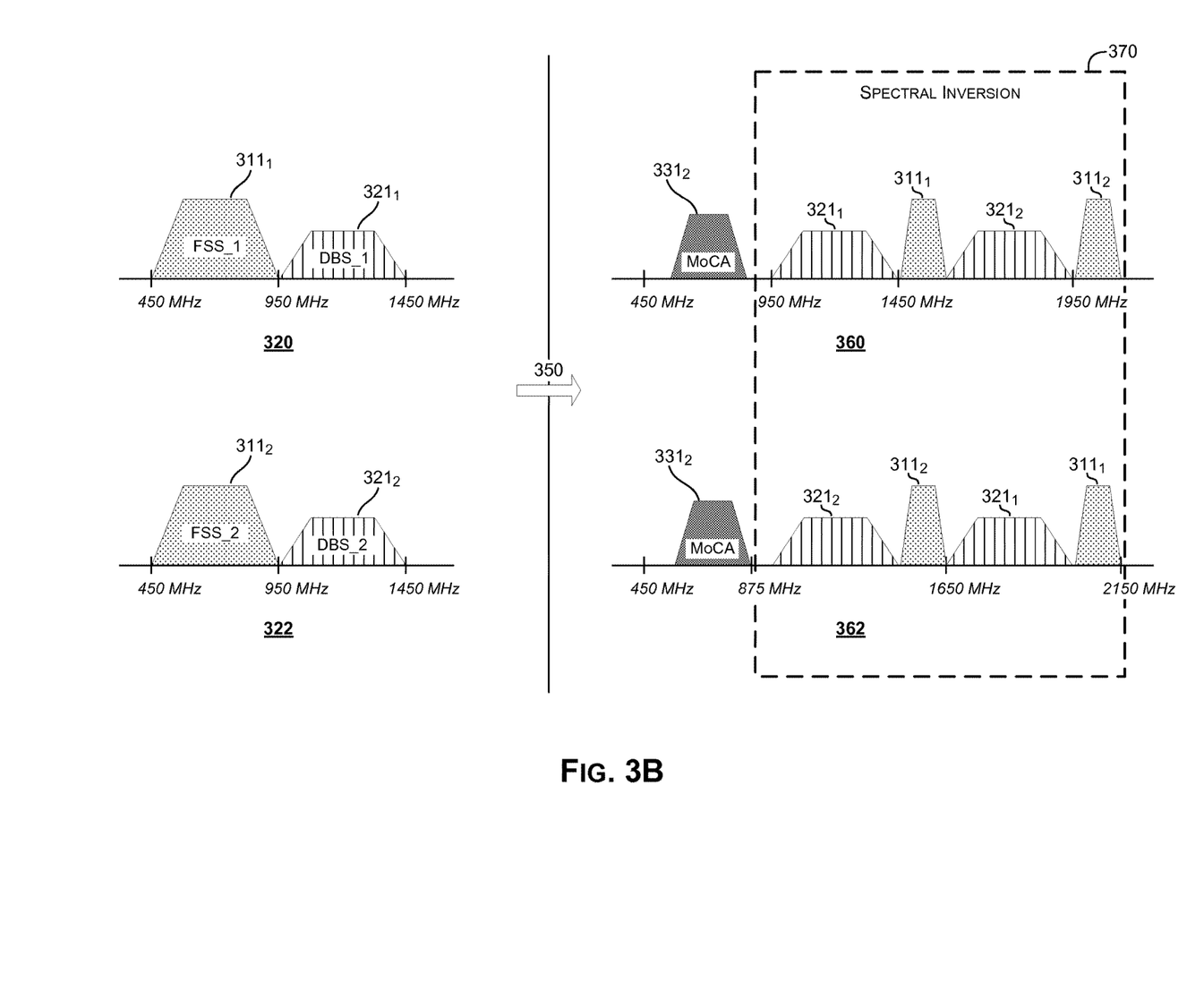
FIG. 3B illustrates example band translation in a system that utilizes spectral inversion to protect signals of an in-home network when handling received signals corresponding to a plurality of standards or bands.

FIG. 3B illustrates example band translation in a system that utilizes spectral inversion to protect signals of an in-home network when handling received signals corresponding to a plurality of standards or bands.

Shown in FIG. 3B is an example band translation with protection of internal signals, such as in a system (e.g., system 200) handling a plurality of satellite signals (e.g., from multiple satellites on multiple inputs) as well as the internal signals (e.g., communications for in-premises networks). In the example scenario depicted in FIG. 3B, band translation with protection 350 may be applied, during processing of the two input satellite signals 300 and 302, after the down-conversion 310 (e.g., on the down-converted signals 320 and 322).

The band translation with protection may be done in an enhanced manner—e.g., efficient and/or cheaply. In accordance with an example implementation of the present disclosure, filtering may be applied within the system processing the signals, and using existing components thereof. For example, a particular component of the system 200, such as the DFE 230, may be configured to handle band translation (and/or mitigate issues relating thereto), in addition to existing/other functions performed thereby. Handling band translation (and/or mitigating issues relating thereto) may be performed in an adaptive manner—e.g., being dynamically activated when needed, and/or being configured to function specifically (e.g., apply to particular frequency range) based on the processed input signals.

Various methods may be used for handling band translation (and/or mitigating issues relating thereto). For example, in the example use scenario shown in FIG. 3B, in order to mitigate expected issues resulting from band translation, filtering may applied (via the DFE 230), particularly in the range of 450 to 750 MHz, and then spectral inversion 370 may be applied to signals before presentation at the system's output, resulting in modified signals presented in output signals 360 and 362. As a result of such filtering and spectral inversion, no FSS interference may occur in the range used by the MoCA signals (e.g., 750 to 875 MHz), and all FSS signals would instead be presented in other frequency ranges (e.g., in the frequency range 1450 to 1650 MHz), particularly in portions where there is no other desired signals (e.g., the DBS signals), and hence no adverse impact. The rest of the FSS band interference (e.g., the one that would have occurred in the range between 450 to 750 MHz), after attenuation by the filtering within the system (e.g., on-chip), may land in the band of interest (e.g., between 1650-1950 MHz), but may be at a level low enough as to cause no significant impact on the signal-to-noise ratio for any desired signals in that range.

Figure 4:
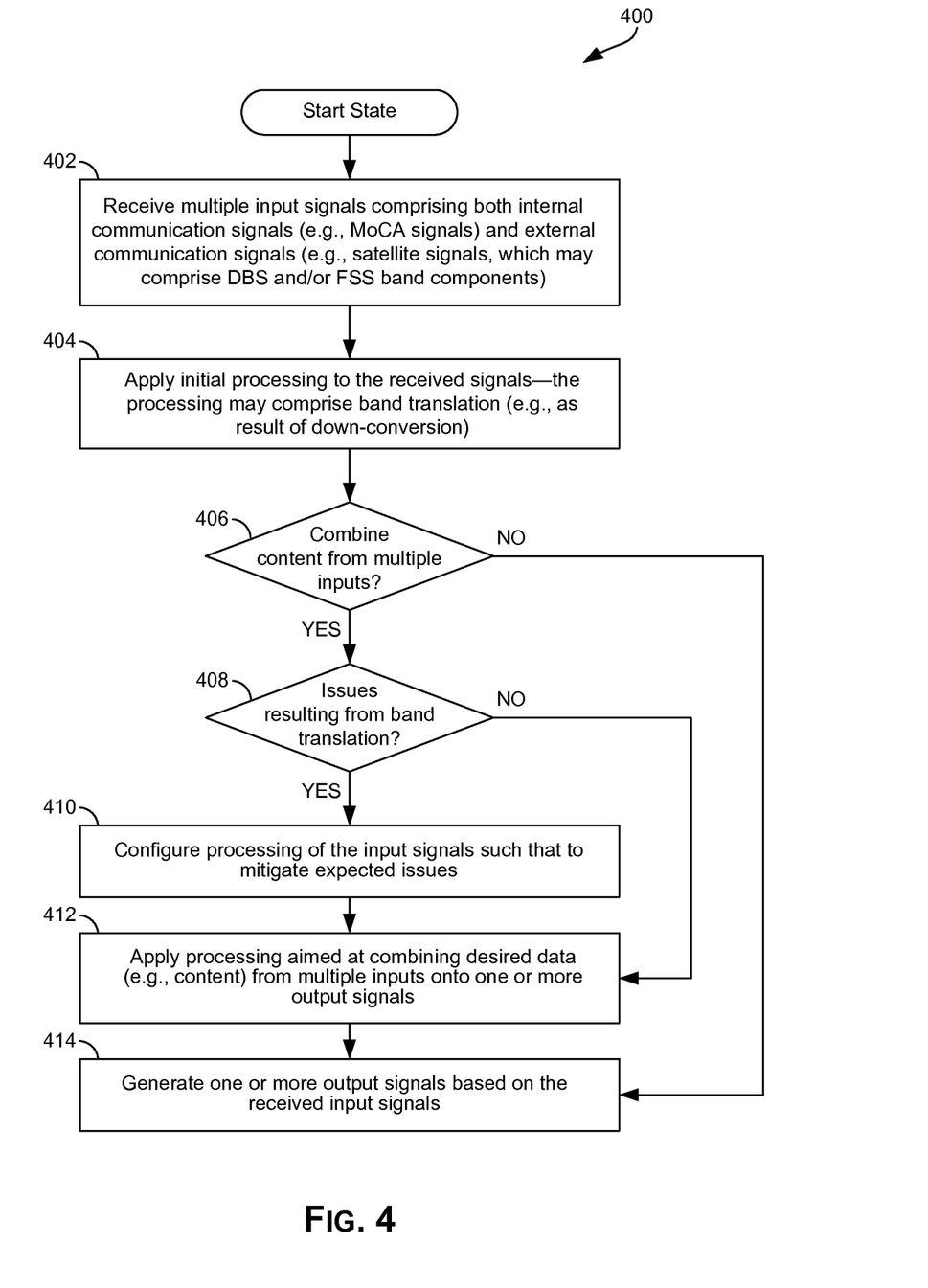
FIG. 4 is a flowchart illustrating an example process for providing band translation with protection of in-home networks.

FIG. 4 is a flowchart illustrating an example process for providing band translation with protection in in-home networks. Referring to FIG. 4, there is shown a flow chart 400, comprising a plurality of example steps, which may be executed in a system (e.g., the system 200) to facilitate providing band translation with protection during reception and handling of signals in an in-home network (e.g., the in-premises network 130).

In step 402, multiple input signals, comprising both internal communication signals (e.g., MoCA signals) and external communication signals (e.g., satellite signals, which may comprise DBS and/or FSS band components) may be received (e.g., by the gateway 140).

In step 404, initial processing may be applied to the received signals—the processing may comprise band translation (e.g., as result of down-conversion).

In step 406, it may be determined whether there is a need to combine components of more than one input signal into at least one output signal. In this regard, such combining may be done, for example, during initial handling, during signal processing, and/or in the output stage (e.g., when generating IF output signal(s)). In instances where it is determined that no such combining is needed, the process may jump to step 414; otherwise the process may proceed to step 408.

In step 408, it may be determined whether the combining of components of more than one input signal into at least one output signal may cause issues. For example, issues may arise where processing of one input signal (e.g., satellite signal, such as a DBS/FSS signal) may result in an output component that may spectrally overlap with an output component corresponding to another input signal (e.g., local signal, such as MoCA signal). In instances where it is determined that no issues would be caused, the process may jump to step 412; otherwise the process may proceed to step 410.

In step 410, processing of the input signals may be configured in a manner to mitigate expected issues. In particular, the mitigation may be configured to be performed on-chip. For example, processing certain input signals (e.g., an FSS component of satellite signals) may be filtered and/or subject to spectral inversion, so as to prevent the expected issues (e.g., overlap with MoCA bands) but without affecting remaining (other) components in the output signals (e.g., DBS components).

In step 412, processing aimed at combining desired data (e.g., content) from multiple inputs onto one or more output signals may be performed.

In step 414, one or more output signals may be generated, based on processing of the multiple input signals.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for non-intrusive noise cancelation.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form. Accordingly, some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:
   receiving by a signal processing chip, a plurality of signals, wherein the plurality of signals comprises at least a first signal corresponding to internal communication within an in-premises network and at least a second signal originating from a source external to the in-premises network;
   processing on-chip, the plurality of input signals, to generate one or more output signals, wherein at least one output signal comprises components corresponding to the first signal and the second signal; and
   mitigating on-chip, during generating of the one or more outputs, at least one effect of including in the at least one output signal a first component corresponding to one of the first signal and the second signal on a second component corresponding to the other one of the first signal and the second signal;
   wherein:
   the mitigating comprises adjusting one or more characteristics associated with one or both of the first component and the second component, by filtering and applying spectral inversion to one or both of the first component and the second component; and
   the mitigating is dynamically activated based on a determination that said at least one effect is occurring.

2. The method of claim 1, wherein the internal communication within the in-premises network comprises Multimedia over Coax Alliance (MoCA) based communication, and the first signal comprises a MoCA signal.

3. The method of claim 1, wherein the source external to the in-premises network comprises a satellite, and the second signal comprises a satellite signal.

4. The method of claim 3, wherein the satellite signal comprises a plurality of components.

5. The method of claim 4, wherein the plurality of components of the satellite signal comprises a first direct broadcast satellite (DBS) component and a second fixed satellite service (FSS) component.

6. The method of claim 1, wherein the at least one effect is caused by having bands corresponding to each of the first component and the second component overlap as a result of the processing of the first signal and the second signal.

7. The method of claim 1, wherein adjusting the one or more characteristics comprises modifying one or more frequency bands, within the at least one output signal, assigned to the one or both of the first component and the second component.

8. The method of claim 1, comprising configuring the mitigating based on and/or to accommodate inclusion of other components in the at least one output signals, corresponding to one or both of the first signal and the second signal.

9. A system, comprising:
one or more circuits for use in a signal processing chip, the one or more circuits being operable to:
receive a plurality of signals, wherein the plurality of signals comprises at least a first signal corresponding to internal communication within an in-premises network and at least a second signal originating from a source external to the in-premises network;
process on-chip, the plurality of input signals, to generate one or more output signals, wherein at least one output signal comprises components corresponding to the first signal and the second signal; and
mitigate on-chip, during generating of the one or more outputs, at least one effect of including into the at least one output signal a first component corresponding to one of the first signal and the second signal on a second component corresponding to the other one of the first signal and the second signal;
wherein:
the mitigating comprises adjusting one or more characteristics associated with one or both of the first component and the second component, by filtering and applying spectral inversion to one or both of the first component and the second component; and
the mitigating is dynamically activated based on a determination that said at least one effect is occurring.

10. The system of claim 9, wherein the internal communication within the in-premises network comprises Multimedia over Coax Alliance (MoCA) based communication, and the first signal comprises a MoCA signal.

11. The system of claim 9, wherein the source external to the in-premises network comprises a satellite, and the second signal comprises a satellite signal.

12. The system of claim 11, wherein the satellite signal comprises a plurality of components.

13. The system of claim 12, wherein the plurality of components of the satellite signal comprises a first direct broadcast satellite (DBS) component and a second fixed satellite service (FSS) component.

14. The system of claim 9, wherein the at least one effect is caused by having bands corresponding to each of the first component and the second component overlap as a result of the processing of the first signal and the second signal.

15. The system of claim 9, wherein adjusting the one or more characteristics comprises modifying one or more frequency bands, within the at least one output signal, assigned to the one or both of the first component and the second component.

16. The system of claim 9, wherein the one or more circuits are operable to configure the mitigating based on and/or to accommodate inclusion of other components in the at least one output signals, corresponding to one or both of the first signal and the second signal.

17. A system, comprising:
a signal processing chip that is configured to handle a plurality of signals, the plurality of signals comprising at least a first signal corresponding to internal communication within an in-premises network and at least a second signal originating from a source external to the in-premises network, the signal processing chip comprising:
a plurality of input circuits, each configured for adaptively handling a corresponding one of the plurality of signals;
one or more processing circuits, configured for processing one or more signals provided by the plurality of input processing paths, the processing comprising combining data carried in the plurality of signals; and
one or more output circuits, configured for generating one or more output signals; wherein at least one output signal comprises components corresponding to the first signal and the second signal; and
at least one mitigation circuit configured for mitigating on-chip, during generating of the one or more outputs, at least one effect of including into the at least one output signal a first component corresponding to one of the first signal and the second signal on a second component corresponding to the other one of the first signal and the second signal;
wherein:
the mitigating comprises adjusting one or more characteristics associated with one or both of the first component and the second component, by filtering and applying spectral inversion to one or both of the first component and the second component; and
the mitigating is dynamically activated based on a determination that said at least one effect is occurring.

* * * * *